(12) United States Patent
Sano

(10) Patent No.: US 11,061,659 B2
(45) Date of Patent: Jul. 13, 2021

(54) CONTROL APPARATUS, TRANSFER METHOD, AND COMPUTER PROGRAM

(71) Applicant: Sumitomo Electric Industries, Ltd., Osaka (JP)

(72) Inventor: Yuki Sano, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/603,078

(22) PCT Filed: Jan. 16, 2018

(86) PCT No.: PCT/JP2018/001040
§ 371 (c)(1),
(2) Date: Oct. 4, 2019

(87) PCT Pub. No.: WO2018/185994
PCT Pub. Date: Oct. 11, 2018

(65) Prior Publication Data
US 2020/0057628 A1 Feb. 20, 2020

(30) Foreign Application Priority Data

Apr. 5, 2017 (JP) .............................. JP2017-075117

(51) Int. Cl.
*G06F 8/65* (2018.01)
*B60W 50/00* (2006.01)
*B60R 16/023* (2006.01)

(52) U.S. Cl.
CPC ............ *G06F 8/65* (2013.01); *B60R 16/0231* (2013.01); *B60W 50/00* (2013.01); *B60W 2050/0083* (2013.01)

(58) Field of Classification Search
CPC ...... G06F 8/65; B60R 16/0231; B60W 50/00; B60W 2050/0083
See application file for complete search history.

(56) References Cited

U.S. PATENT DOCUMENTS

2012/0246276 A1* 9/2012 Matsubara ............ H04L 47/762
709/219
2013/0114422 A1* 5/2013 Clark ............... H04N 21/26216
370/252
(Continued)

FOREIGN PATENT DOCUMENTS

JP 2002-164925 A 6/2002
JP 2007-065856 A 3/2007
(Continued)

OTHER PUBLICATIONS

Yuta Yoshimura, et al., "A study on network reliability design for computer network age," IEICE Technical Report, Jan. 17, 2014, vol. 113, No. 405, pp. 93-98 [Cited in Notice of Reasons for Refusal].
(Continued)

*Primary Examiner* — Daxin Wu
(74) *Attorney, Agent, or Firm* — Baker Botts L.L.P.; Michael A. Sartori

(57) ABSTRACT

Provided is a control apparatus which is connected to an on-vehicle control device via an in-vehicle communication line, and constitutes, together with the on-vehicle control device, an in-vehicle network with the in-vehicle communication line being a transmission path. The control apparatus includes: a storage unit configured to store therein an update program for the on-vehicle control device; a monitoring unit configured to monitor an occupancy of the in-vehicle communication line; and a transfer control unit configured to control a timing to transfer the stored update program to the on-vehicle control device, on the basis of the occupancy being monitored.

6 Claims, 7 Drawing Sheets

(56) References Cited

U.S. PATENT DOCUMENTS

2014/0109075 A1* 4/2014 Hoffman ............. G06F 11/1464
                                                      717/169
2015/0178070 A1* 6/2015 Doi ........................ H04W 4/50
                                                      717/172
2016/0212055 A1* 7/2016 Agarwal ................ H04L 47/196
2018/0018160 A1* 1/2018 Teraoka ................ B60R 16/023
2018/0081671 A1* 3/2018 Naruse ................ G06F 16/2365

FOREIGN PATENT DOCUMENTS

| | | |
|---|---|---|
| JP | 2012-178035 A | 9/2012 |
| JP | 2013-515417 A | 5/2013 |
| WO | 2011/076737 A1 | 6/2011 |
| WO | 2012/114194 A1 | 8/2012 |

OTHER PUBLICATIONS

Notice of Reasons for Refusal issued in Japan Patent Application No. 2018-532476, dated Nov. 22, 2018.

\* cited by examiner

CONTROL APPARATUS, TRANSFER METHOD, AND COMPUTER PROGRAM

TECHNICAL FIELD

The present invention relates to a control apparatus, a transfer method, and a computer program.

This application claims priority on Japanese Patent Application No. 2017-075117 filed on Apr. 5, 2017, the entire contents of which are incorporated herein by reference.

BACKGROUND ART

In the automotive field in recent years, vehicles have become advanced in functionality, and a diverse range of devices are installed in vehicles. Accordingly, vehicles are equipped with large numbers of control devices, so-called ECUs (Electronic Control Units), for controlling these on-vehicle devices.

Each vehicle is equipped with various types of ECUs such as: traveling-type ECUs that control an engine, a brake, an EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions thereof in response to upgrading of the control programs. In addition, data, such as map information and control parameters, necessary for execution of the control programs also need to be overwritten.

For example, Patent Literature 1 discloses a system which receives a correction program for correcting a vehicle control program from an information providing center that is an external device, and rewrites the vehicle control program by using the program in response to a request from the information providing center. At this time, it is determined whether or not the operating state of the vehicle is a state that allows rewriting of the control program, and rewriting of the control program is performed when the determination result is positive.

CITATION LIST

Patent Literature

PATENT LITERATURE 1: Japanese Laid-Open Patent Publication No. 2007-65856

SUMMARY OF INVENTION

According to one embodiment, a control apparatus is connected to an on-vehicle control device via an in-vehicle communication line, and constitutes, together with the on-vehicle control device, an in-vehicle network with the in-vehicle communication line being a transmission path. The control apparatus includes: a storage unit configured to store therein an update program for the on-vehicle control device; a monitoring unit configured to monitor an occupancy of the in-vehicle communication line; and a transfer control unit configured to control a timing to transfer the stored update program to the on-vehicle control device, on the basis of the occupancy being monitored.

According to another embodiment, a method for transferring an update program for an on-vehicle control device from a control apparatus to the on-vehicle control device is provided. The control apparatus is connected to the on-vehicle control device via an in-vehicle communication line, and constitutes, together with the on-vehicle control device, an in-vehicle network with the in-vehicle communication line being a transmission path. The method includes the steps of: monitoring an occupancy of the in-vehicle communication line; and controlling a timing to transfer the update program to the on-vehicle control device, on the basis of the occupancy being monitored.

According to still another embodiment, a computer program for causing a computer to function as a control apparatus is provided. The control apparatus is connected to an on-vehicle control device via an in-vehicle communication line, and constitutes, together with the on-vehicle control device, an in-vehicle network with the in-vehicle communication line being a transmission path. The computer has a storage unit in which an update program for the on-vehicle control device is stored. The computer program causes the computer to function as: a monitoring unit configured to monitor an occupancy of the in-vehicle communication line; and a transfer control unit configured to control a timing to transfer the stored update program to the on-vehicle control device, on the basis of the occupancy being monitored.

DESCRIPTION OF EMBODIMENTS

Figure 1:
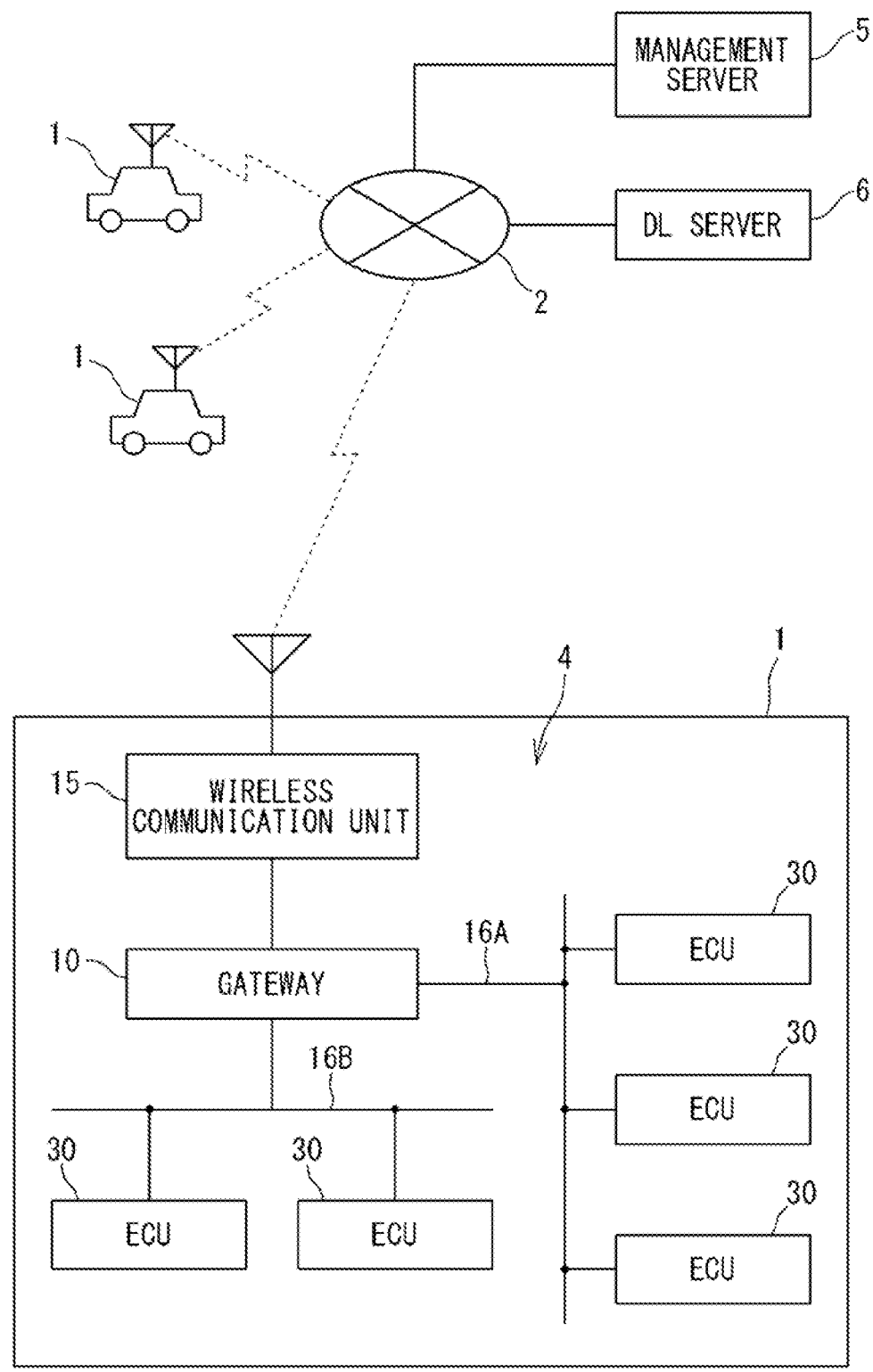
FIG. 1 is a diagram showing an overall configuration of a program updating system.

<Problems to be Solved by the Present Disclosure>

With an increase in the number of ECUs mounted on a vehicle, the number of update programs is increased. Meanwhile, with technological development having been accelerated, update frequencies of control programs are increased. Therefore, the control programs need to be efficiently updated. As one method for efficiently updating a control program, it is conceivable to update the control program with an update program received from a server while the vehicle is traveling.

A plurality of ECUs mounted on a vehicle may be connected to an in-vehicle network to realize one or a plurality of functions in cooperation with each other while exchanging information for control. In particular, while the vehicle is traveling, a large number of pieces of information are exchanged on the in-vehicle network, which may cause increased occupancies of communication lines.

If it is attempted to transfer, to a target ECU via a communication line having a high occupancy, an update program whose size is great relative to the free size of the communication line, an excessive load will be applied to the in-vehicle network. The excessive load applied to the in-vehicle network may cause the transfer time to be longer than usual, or may cause the information for control during communication to be lost due to communication failure. If the transfer time is protracted, the state where the occupancy of the corresponding communication line is high is continued over a long time, which may impede exchange of information for control that is necessary for traveling. The impediment in the exchange of the information for control may hinder implementation of the functions. In addition, the information for control being lost during communication may also hinder implementation of the functions.

An object in one aspect of the present disclosure is to provide a control apparatus, a transfer method, and a computer program which are able to efficiently update a control program without an excessive load being applied to an in-vehicle network.

<Effect of the Disclosure>

According to this disclosure, it is possible to efficiently update a control program without an excessive load being applied to an in-vehicle network.

[Description of Embodiments]

Embodiments of the present disclosure include at least the following.

(1) A control apparatus included in the embodiments is a control apparatus which is connected to an on-vehicle control device via an in-vehicle communication line, and constitutes, together with the on-vehicle control device, an in-vehicle network with the in-vehicle communication line being a transmission path. The control apparatus includes: a storage unit configured to store therein an update program for the on-vehicle control device; a monitoring unit configured to monitor an occupancy of the in-vehicle communication line; and a transfer control unit configured to control a timing to transfer the stored update program to the on-vehicle control device, on the basis of the occupancy being monitored.

Since the timing to transfer the update program to the on-vehicle control device on the basis of the occupancy of the in-vehicle communication line is controlled, it is possible to prevent transfer of the update program from being performed in the state where the occupancy of the in-vehicle communication line is high. This control enables efficient transfer of the update program to the on-vehicle control device while preventing the transfer time from becoming longer than usual, and preventing information for control during communication from being lost due to communication failure.

(2) Preferably, the transfer control unit calculates an index value indicating a result of comparison between a size of the update program and a free bandwidth, of the in-vehicle communication line, obtained from the occupancy, and determines, based on the index value, whether or not to transfer the update program.

Since whether or not to transfer the update program is determined based on the index value, it is possible to prevent transfer of an update program whose size is larger by a predetermined extent than the free bandwidth of the in-vehicle communication line. Thus, it is possible to prevent an update program whose size is large relative to the free bandwidth of the in-vehicle communication line from being transferred to the on-vehicle control device in the state where the occupancy of the in-vehicle communication line is high.

(3) Preferably, the index value is a value indicating a ratio of the size of the update program to the free bandwidth, and the transfer control unit starts transfer of the update program when the index value is smaller than a first threshold value, and does not start transfer of the update program when the index value is equal to or greater than the first threshold value.

Since the first threshold value is set to the index value at which the transfer time is longer than usual or the information for control during communication is lost due to communication failure, it is possible to prevent transfer of data for update whose size is great relative to the free bandwidth of the in-vehicle communication line in the state where the occupancy of the in-vehicle communication line is high.

(4) Preferably, when the index value is equal to or greater than the first threshold value and a predetermined suspending condition is satisfied, the transfer control unit does not start transfer of the update program, but calculates an index value again within a period during which the update program satisfies the suspending condition, and determines, based on the index value, whether or not to transfer the update program. When the index value is equal to or greater than the first threshold value and the suspending condition is not satisfied, the transfer control unit does not transfer the update program.

Thus, when the occupancy of the in-vehicle communication line is changed (reduced) within the period during which the suspending condition is satisfied and thereby the index value becomes smaller than the first threshold value, transfer of the update program is started. Therefore, the update program can be efficiently transferred according to a change in the occupancy.

(5) Preferably, the suspending condition includes a condition that another update program to be transferred, which is different from the above update program, is present.

Thus, when the index value is equal to or greater than the first threshold value and therefore transfer is determined not to be performed, and if another update program is present, determination whether or not to transfer the other update program can be preferentially performed. Thus, when there are a plurality of update programs to be transferred, these update programs can be efficiently transferred.

(6) Preferably, the control apparatus is connected to an output device, and when transfer of the update program is not started, the transfer control unit outputs a control signal that causes the output device to perform a notification indicating that transfer of the update program is not started.

When the control signal is output to the output device, the output device notifies that transfer of the update program is not started. This notification allows the user to take an effective countermeasure for update of the control program, such as stopping the vehicle and changing the control mode to the update mode for transfer of the update program, or garaging the vehicle in a dealer and connecting the on-vehicle control device to a dedicated device for transfer of the update program. Therefore, the control program can be efficiently updated.

(7) Preferably, the free bandwidth is a bandwidth obtained by eliminating the occupancy from a maximum occupancy that is allowed for the in-vehicle communication line, and the in-vehicle network includes a plurality of in-vehicle communication lines having different maximum occupancies.

Thus, the timing to transfer the update program is controlled by using the free bandwidth according to the in-vehicle communication line to which the on-vehicle control device is connected. Therefore, even when a plurality of in-vehicle communication lines having different maximum occupancies are included in the in-vehicle network, it is possible to efficiently transfer the update program while reducing a communication load using an in-vehicle communication line used for the transfer, flexibly for each in-vehicle communication line.

(8) Preferably, the transfer control unit calculates a time required until the transfer is completed, by using the size of the update program and a transfer speed of the update program determined based on the occupancy, and determines, based on the required time, whether or not to continue the transfer of the update program.

Since whether or not to continue the transfer of the update program is determined based on the required time, it is possible to suspend the transfer of an update program having a great size that causes the time required until completion of transfer to be equal to or longer than a predetermined time. Thus, the update program having a great size is prevented from being transferred in the state where the occupancy of the in-vehicle communication line is high.

(9) Preferably, the transfer control unit updates the transfer speed of the update program at a predetermined update interval, on the basis of the occupancy, during the transfer of the update program, calculates the required time from the updated transfer speed, and determines, based on the required time, whether or not to continue the transfer of the update program.

Thus, even when the occupancy of the in-vehicle communication line is changed during the transfer, the transfer speed of the update program can be adjusted to an appropriate transfer speed according to the occupancy, and an update program, whose transfer time required until completion of transfer will be equal to or longer than a predetermined time according to the updated transfer speed, can be prevented from being transferred. Therefore, transfer of the update program can be continued or suspended flexibly according to a change in the occupancy during the transfer.

(10) Preferably, the transfer control unit suspends the transfer when the required time is equal to or longer than a second threshold value.

When the second threshold value is set to a transfer time that is longer than usual or a transfer rate that causes information for control during communication to be lost due to communication failure, it is possible to prevent transfer of an update program for which a transfer speed that needs such a transfer time is set.

(11) Preferably, when the transfer control unit has suspended the transfer, the transfer control unit controls a timing to transfer another update program to be transferred, to the on-vehicle control device.

Thus, when the calculated required time is equal to or longer than the second threshold value and therefore transfer is determined to be suspended, and if another update program is present, it is possible to preferentially perform determination whether or not to transfer the other update program. Thus, when there are a plurality of update programs to be transferred, these update programs can be efficiently transferred.

(12) Preferably, the control apparatus is connected to the output device, and when transfer of the update program is suspended, the transfer control unit outputs a control signal that causes the output device to perform a notification indicating that transfer of the update program is suspended.

When the control signal is output to the output device, the output device notifies that the transfer of the update program is suspended. This notification allows the user to take an effective countermeasure for resuming the transfer of the update program, such as causing the vehicle to stop and enter the update mode to transfer the update program, or garaging the vehicle in a dealer and connecting the on-vehicle control device to a dedicated device to transfer the update program.

(13) A transfer method included in the embodiments is a method for transferring an update program for an on-vehicle control device to the on-vehicle control device from a control apparatus according to any one of the above (1) to (12).

This transfer method provides the same effects as those of the control apparatuses according to the above (1) to (12).

(14) A computer program included in the embodiments causes a computer to function as a control apparatus according to any one of the above (1) to (12).

This computer program provides the same effects as those of the control apparatuses according to the above (1) to (12).

[Detailed Description of Embodiments]

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program updating system according to an embodiment.

As shown in FIG. 1, the program updating system of this embodiment includes vehicles 1, a management server 5, and a DL (download) server 6 which are communicable with each other via a wide-area communication network 2.

The management server 5 manages update information of each vehicle 1. The DL server 6 stores therein update programs. The management server 5 and a DL server 6 are operated by, for example, the automobile manufacturer of the vehicles 1, and are communicable with large numbers of vehicles 1 owned by users registered as members in advance.

Each vehicle 1 is provided with: an in-vehicle network (communication network) 4 including a plurality of ECUs 30 and a gateway 10 which are connected via in-vehicle communication lines 16; a wireless communication unit 15; and various on-vehicle devices (not shown) controlled by the respective ECUs 30.

The in-vehicle network 4 has a plurality of in-vehicle communication lines 16A and 16B, and includes a plurality of communication groups, each consisting of a plurality of ECUs 30, which are bus-connected to the respective in-vehicle communication lines 16A and 16B. The gateway 10 relays communication between the communication groups. Therefore, the in-vehicle communication lines 16A and 16B are connected to the gateway 10. The in-vehicle communication lines 16A and 16B are also collectively referred to as a in-vehicle communication line 16.

The wireless communication unit 15 is communicably connected to the wide-area communication network 2 such as a mobile phone network, and is connected to the gateway 10 via an in-vehicle communication line. The wireless communication unit 15 receives information from external devices such as the management server 5 and the DL server 6 via the wide-area communication network 2, and the gateway 10 transmits the information to the ECUs 30 via the in-vehicle communication line 16.

The gateway 10 transmits information obtained from the ECUs 30 to the wireless communication unit 15, and the wireless communication unit 15 transmits the information to the external devices such as the management server 5.

The ECUs 30 exchange information via the in-vehicle communication line 16.

As for the wireless communication unit 15 installed in the vehicle 1, devices such as a mobile phone, a smart phone, a tablet-type terminal, and a notebook PC (Personal Computer) possessed by the user are conceivable in addition to an on-vehicle exclusive communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program updating system shown in FIG. 1, the management server 5 and the DL server 6 are configured as separated servers. However, these servers 5 and 6 may be configured as a single server unit. Each of the management server 5 and the DL server 6 may be composed of a plurality of devices.

[Internal Configuration of Gateway]

Figure 2:
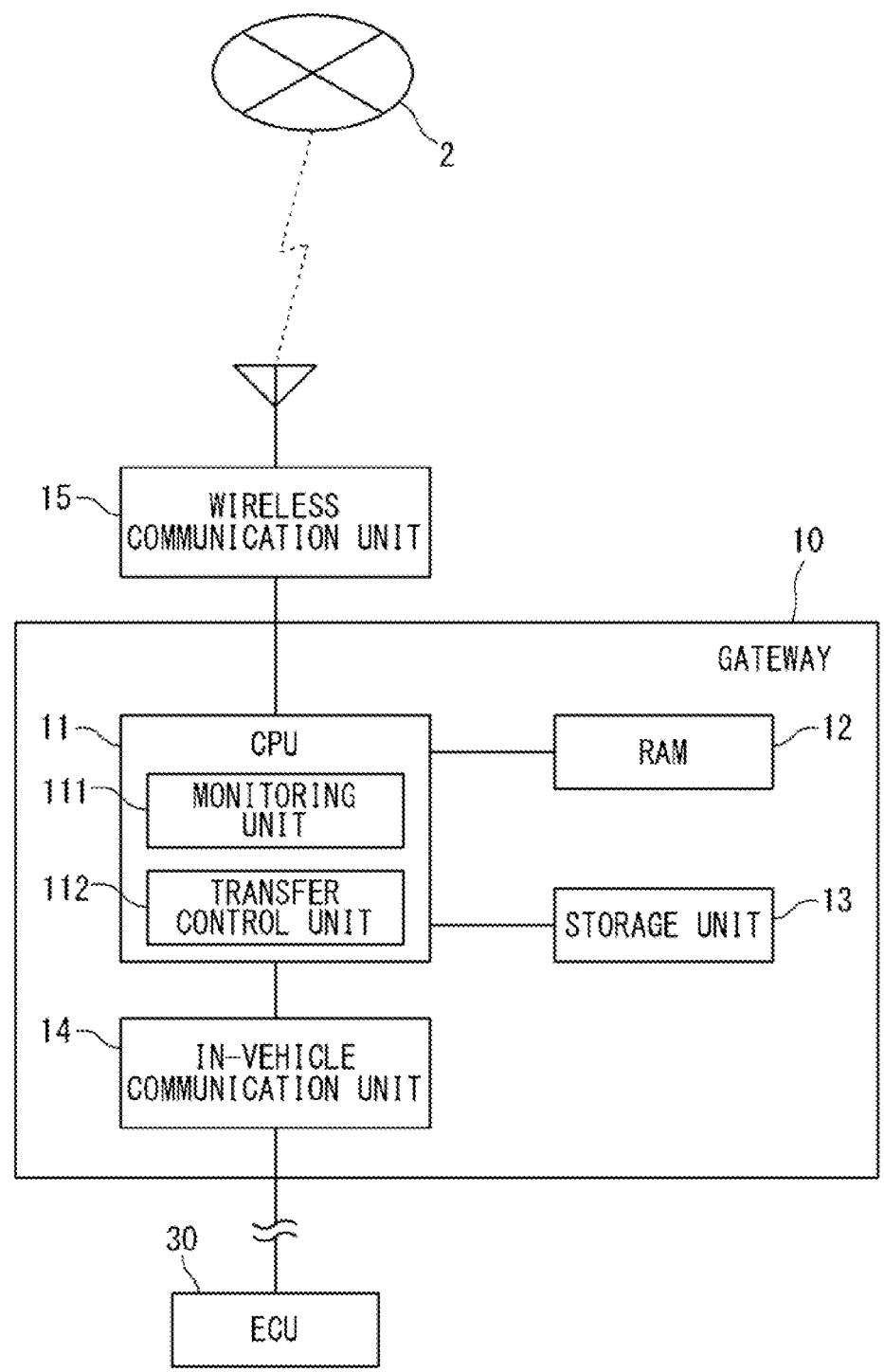
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line in FIG. 2, the gateway 10 and the wireless communication unit 15 may be integrated with each other as a single device.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission from a computer device such as a server computer.

In this aspect, the same applies to a computer program executed by a CPU 31 of the ECU 30 (refer to FIG. 3) described later, and a computer program executed by a CPU 51 of the management server 5 (refer to FIG. 4) described later.

In the following description, transfer (transmission) of data from a host device to a client device is also referred to as "download".

The storage unit 13 consists of a nonvolatile memory element, such as a flash memory or an EEPROM, and the like. The storage unit 13 stores therein programs to be executed by the CPU 11, data required for execution of the programs, and the like, and also stores therein update programs for the respective ECUs 30 received from the DL server 6, and the like.

The plurality of ECUs 30 are connected to the in-vehicle communication unit 14 via the in-vehicle communication lines 16 arranged in the vehicle 1. The in-vehicle communication unit 14 communicates with the ECUs 30 according to the standard of CAN (Controller Area Network), for example. The communication standard adoptable by the in-vehicle communication unit 14 is not limited to CAN. Other standards such as CANFD (CAN with Flexible Data Rate), LIN (Local Interconnect Network), Ethernet (registered trademark), or MOST (Media Oriented Systems Transport: MOST is registered trademark) may be adopted. The plurality of in-vehicle communication lines 16A and 16B may include communication lines based on different communication standards.

The in-vehicle communication unit 14 transmits information provided from the CPU 11 to target ECUs 30, and provides information received from the ECUs 30 to the CPU 11. The in-vehicle communication unit 14 may communicate with the ECUs 30 according to other communication standards that are used for the in-vehicle network 4, apart from the above communication standards.

The wireless communication unit 15 includes a wireless communication apparatus including an antenna and a communication circuit that executes transmission/reception of radio signals from the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a communication unit that functions as a relay device inside the vehicle 1 may be adopted. This communication unit may have a connector to which a communication cable conforming to a standard such as USB (Universal Serial Bus) or RS232C is connected, and may perform wired communication with another communication device connected thereto via the communication cable. Alternatively, this communication unit may have an interface conforming to a standard such as Bluetooth (registered trademark) or Wi-Fi (Wireless Fidelity: registered trademark), and may perform wireless communication with another communication device connected thereto via short-range radio.

If the other communication device and the external device such as the management server 5 can wirelessly communicate with each other via the wide-area communication network 2, the external device and the gateway 10 become communicable with each other through a communication path consisting of, in this order, the external device, the other communication device, the communication unit, and the gateway 10.

[Internal Configuration of ECU]

Figure 3:
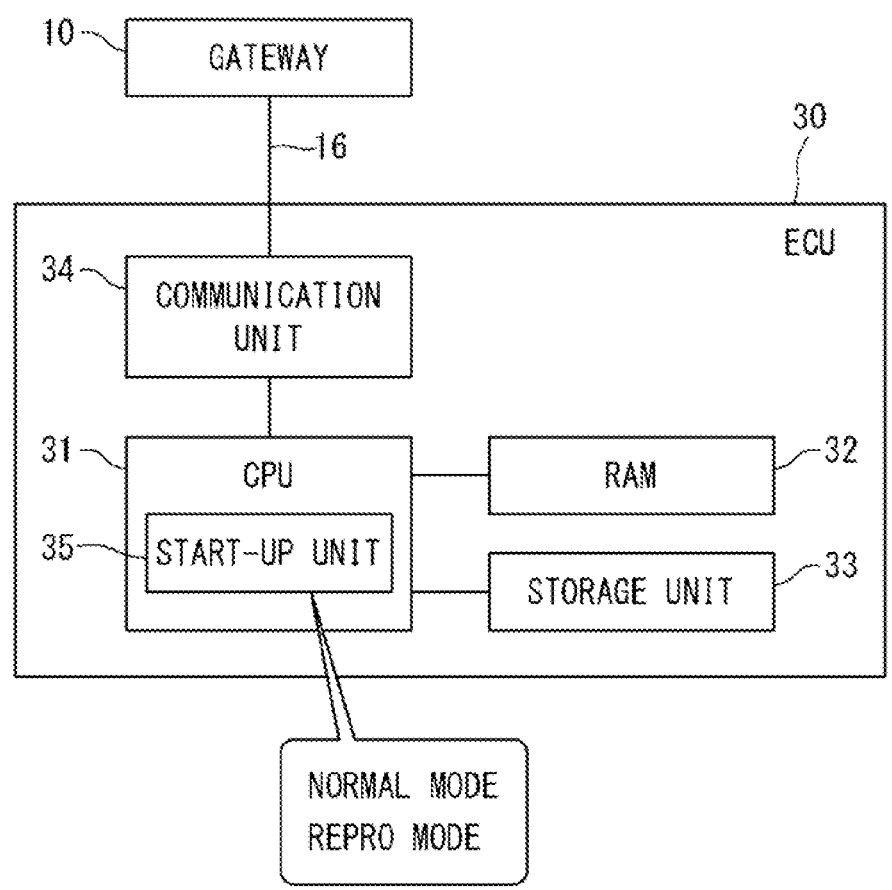
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECU 30 is an on-vehicle control device that separately controls a target device installed in the vehicle 1. Examples of the types of ECUs 30 include a power supply control ECU, an engine control ECU, a steering control ECU, and a door lock control ECU.

The CPU 31 controls the operation of a target device under the charge of the CPU 31, by reading out one or a plurality of programs previously stored in the storage unit 33 to the RAM 32 and executing the read program. The CPU 31 may also be a CPU representing a plurality of CPU groups, and a control to be performed by the CPU 31 may be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores therein programs to be read and executed by the CPU 31. Examples of information stored in the storage unit 33 include: a computer program (hereinafter referred to as "control program") that causes the CPU 31 to execute information processing for controlling target equipment that is an in-vehicle control target; and data to be used in executing the program, such as parameters and map information.

The gateway 10 is connected to the communication unit 34 via the in-vehicle communication line 16 laid in the vehicle 1.

The communication unit 34 communicates with the gateway 10 according to a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 according to other communication standards that are used for the on-vehicle network, apart from the above communication standards.

The CPU 31 of the ECU 30 includes a start-up unit 35 that switches the mode of control performed by the CPU 31 between a "normal mode" and a "reprogramming mode" (hereinafter also referred to as "repro mode").

The normal mode is a control mode in which the CPU 31 of the ECU 30 executes original control for the target device (e.g., engine control for a fuel engine or door lock control for a door lock motor).

The reprogramming mode is a control mode in which the CPU 31 updates the control program used for controlling the target device.

That is, the reprogramming mode is a control mode in which the CPU 31 performs erasing/overwriting of data of the control program from/on an ROM area in the storage unit 33. The CPU 31 in this control mode does not execute the original control for the target device to reduce the occupancy of the in-vehicle communication lines 16, thus realizing early update (upgrade), to a new version, of the control program stored in the ROM area in the storage unit 33.

In upgrading the control program, when the CPU 31 writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

[Internal Structure of Management Server]

Figure 4:
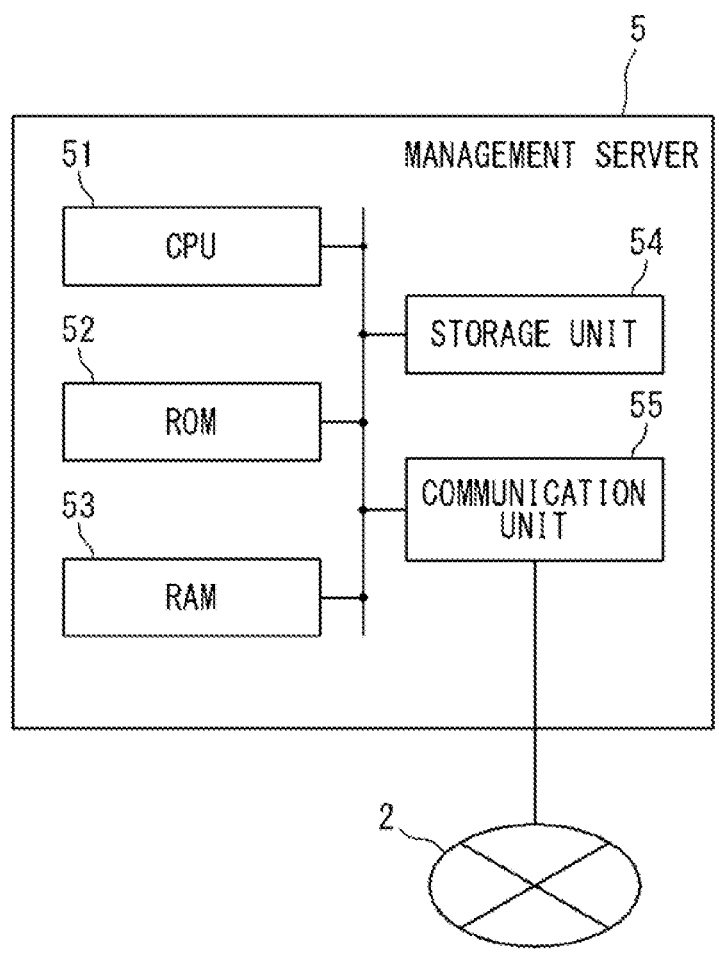
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read program, the CPU 51 controls the operation of each hardware component, and causes the management server 5 to function as an external device that is communicable with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process according to a predetermined communication standard. The communication unit 55 executes the communication process while being connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence]

Figure 5:
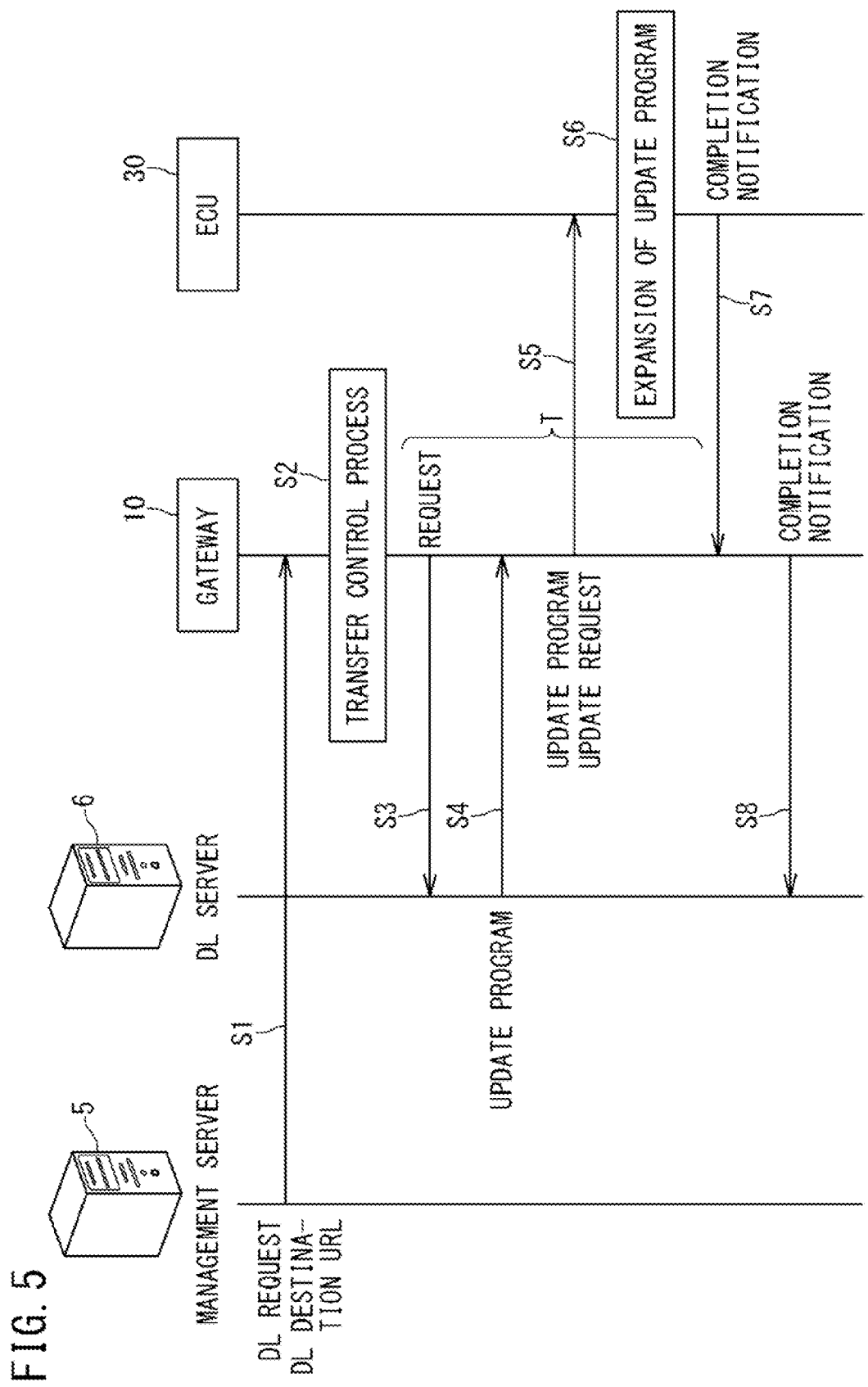
FIG. 5 is a sequence diagram showing an example of flow of updating of a control program, which is executed in the program updating system.

FIG. 5 is a sequence diagram showing an example of a flow of update of a control program, which is executed in the program updating system of the present embodiment. One or a plurality of update programs are stored in the DL server 6, and for example, the management server 5 determines a timing to update a control program of an ECU of the vehicle 1. The timing of update may be set by, for example, the automobile manufacturer of the vehicle 1.

A control program is not limited to the program itself, and includes data such as parameters and map information to be used in executing the program. The term "control program" represents both the program and the data. Likewise, an update program includes not only a program for updating a program but also data for updating data used for executing the program.

When a time to update the control program has arrived, the management server 5 notifies the gateway 10 of the corresponding vehicle 1 of the update (step S1). In step S1, information for update, such as a destination URL of the update program and the size (capacity) of the update program, is transmitted together with a download request from the management server 5 to the gateway 10.

Upon receiving the notification of update from the management server 5, the gateway 10 executes a transfer control process of controlling a timing to transfer the update program to the target ECU 30 (step S2). The transfer control process will be described later.

The gateway 10 starts transfer of the update program at the timing to transfer the update program to the target ECU 30. The timing has been obtained in the transfer control process in step S2. That is, based on the information for update, the gateway 10 requests the DL server 6 to download the update program (step S3).

Upon receiving the download request from the gateway 10, the DL server 6 transfers, to the gateway 10, the update program to be downloaded, and requests update of the control program (data to be updated) (step S4).

The gateway 10 downloads the update program, and then transfers the update program to the target ECU 30, and requests update of the control program (step S5). The gateway 10 may request the target ECU 30 to update of the control program, upon receiving permission of update from a user.

The target ECU 30, which has downloaded the update program, expands the update program in response to the request from the gateway 10, and updates the control program (step S6). When the update is completed, the target ECU 30 notifies the gateway 10 of completion of update (step S7). Upon receiving this notification, the gateway 10 notifies the DL server 6 of completion of update (step S8).

[Functional Configuration of Gateway]

With reference to FIG. 2, the CPU 11 of the gateway 10 includes a monitoring unit 111 and a transfer control unit 112 as functions for executing the transfer control process. These functions are implemented by the CPU 11 when the CPU 11 reads out one or a plurality of programs stored in the storage unit 13 and executes the read program. However, at least a part of the functions may be implemented by hardware such as an electronic circuit.

The function, of the CPU 11, which is represented by the monitoring unit 111 (hereinafter this function is referred to as "monitoring unit 111") monitors an occupancy Oc of each in-vehicle communication line 16. Each of the gateway 10 and the ECUs 30, which are connected to the in-vehicle network 4, stores its own ID in a frame in accordance with a format called a data frame, and outputs the frame to the in-vehicle communication line 16. In addition, each of the gateway 10 and the ECUs 30 monitors the frames being transmitted in the in-vehicle communication line 16 to which it is connected, and receives a data frame in which an ID determined to be received by itself is stored. At this time, the monitoring unit 111 measures times t1, t2, t3, . . . , to at which the data frames have occupied the target in-vehicle communication line 16 within a predetermined measurement time q, and divides an accumulated value of the times by the measurement time q to calculate the occupancy Oc (Oc=(t1+t2+t3+ . . . +tn)/q).

The function, of the CPU 11, which is represented by the transfer control unit 112 (hereinafter this function is referred to as "transfer control unit 112") controls the timing to transfer the update program via the in-vehicle communication line 16, based on the occupancy Oc of the in-vehicle communication line 16. In the first embodiment, the transfer control unit 112 determines whether or not transfer of the update program via the in-vehicle communication line 16 can be started, based on the occupancy Oc of the in-vehicle communication line 16, and starts transfer of the update program in accordance with the result of the determination.

The transfer control unit 112 calculates a free bandwidth B of an in-vehicle communication line 16 being monitored by the monitoring unit 111, based on the occupancy Oc of the in-vehicle communication line 16. Then, based on the result of comparison between the free bandwidth B and the size Δ of the update program, the transfer control unit 112 determines whether or not to transfer the update program. The free bandwidth B of the in-vehicle communication line 16 is the bandwidth (free space) of a frequency band other than a frequency band that is being used for current communication of the in-vehicle communication line 16. In other words, the free bandwidth B is an available bandwidth for further communication in addition to the current communication state. The free bandwidth B is, for example, a value (B=Bw(1−Oc)) obtained by subtracting the currently used bandwidth, which is obtained based on the occupancy Oc of the in-vehicle communication line 16, from the whole bandwidth Bw of the in-vehicle communication line 16.

The transfer control unit 112 calculates an index value regarding an index indicating comparison between the free bandwidth B and the size Δ of the update program, and determines, based on the index value, whether or not to transfer the update program. The index indicating the comparison is, for example, a ratio of the size Δ of the update program to the free bandwidth B, and the transfer control unit 112 calculates the index value Δ/B. The transfer control unit 112 stores, as a threshold value α (first threshold value) in advance, an index value that allows transfer of the update program, and compares the calculated index value Δ/B with the threshold value α.

When the index value Δ/B is smaller than the threshold value α, the transfer control unit 112 determines to start transfer of the update program. The index value Δ/B being smaller than the threshold value α means that the size Δ of the update program is small relative to a band (free band) B in which transfer using the in-vehicle communication line 16 is possible. When the index value Δ/B is equal to or greater than the threshold value α, the size Δ of the update program becomes great relative to the free band B of the in-vehicle communication line 16. Therefore, the transfer time may become longer than usual, or information for control during communication may be lost due to communication failure.

The index indicating the comparison is not limited to the ratio of the size Δ of the update program to the free bandwidth B. Other indices, such as a ratio of the free bandwidth B to the size Δ of the update program (index value B/Δ) and a difference between the free bandwidth B and the size Δ of the update program (index value |B−Δ|), are adoptable. Alternatively, the index may be a relationship between the occupancy Oc and the size Δ. The transfer control unit 112 stores therein the threshold value α according to the index value in advance. The threshold value α is not a fixed value, and may be set for each update program by the management server 5.

The free bandwidth B itself may be used as the index value. The free bandwidth B may be used when the size Δ of the update program does not vary from program to program, or when the update programs have substantially the same size, for example. In this case, the transfer control unit 112 transfers the update program when the free bandwidth B is smaller than the predetermined threshold value, and does not transfer the update program when the free bandwidth B is equal to or greater than the threshold value. Thus, the transfer control process in the gateway 10 can be simplified.

[Transfer Control Process]

Figure 6:
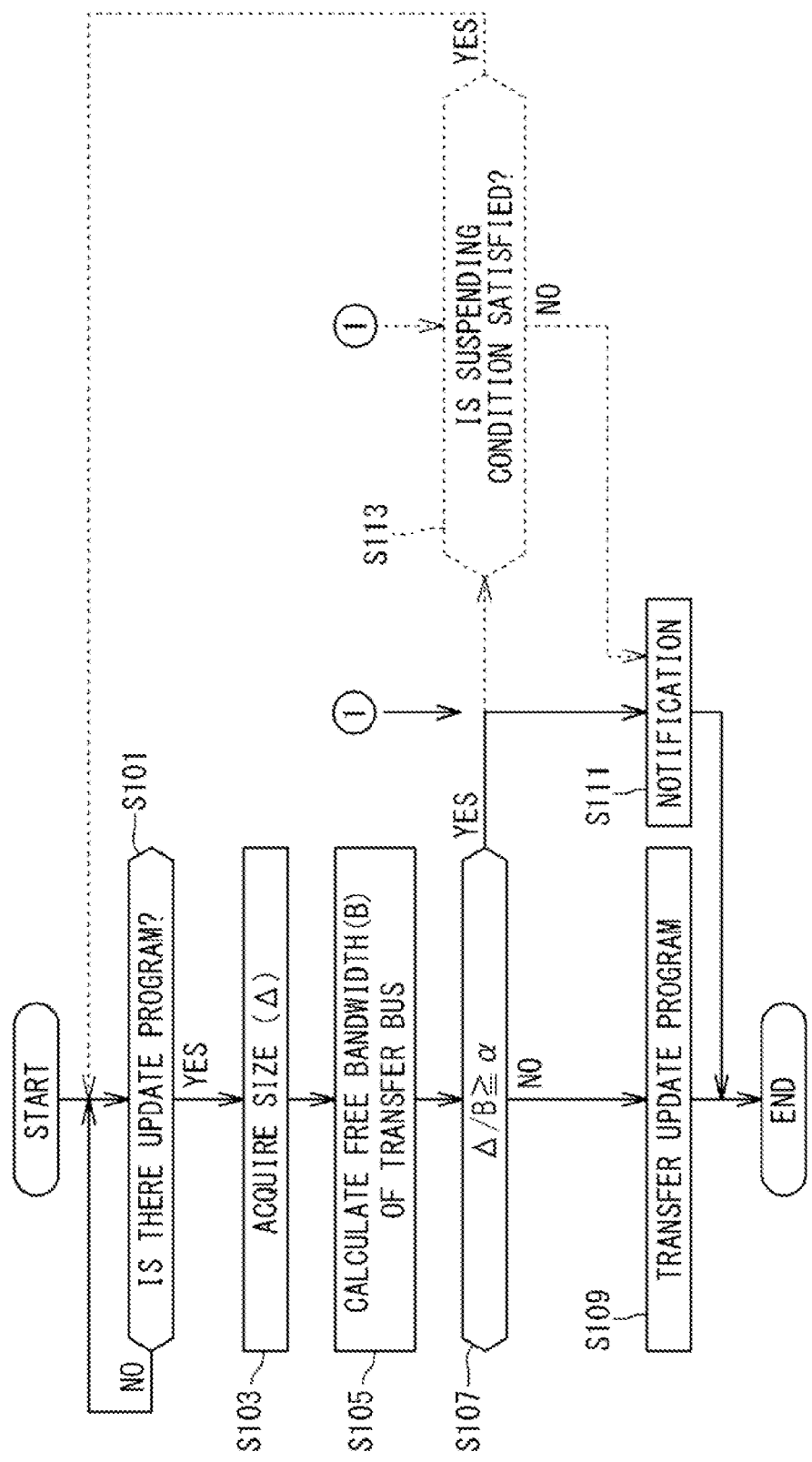
FIG. 6 is a flowchart showing a specific content of a transfer control process in the program updating system according to a first embodiment.

FIG. 6 is a flowchart showing the specific content of the transfer control process in the program updating system according to the first embodiment. The process shown in the flowchart of FIG. 6 is executed when the CPU 11 of the gateway 10 implements the functions of the monitoring unit 111 and the transfer control unit 112 by reading out one or a plurality of programs stored in the storage unit 13 onto the RAM 12 and executing the read program. The process shown in FIG. 6 is repeatedly executed at a pre-defined timing such as a predetermined time interval while the CPU 11 is being activated.

With reference to FIG. 6, the CPU 11 determines whether or not there is an update program to be transferred to the ECU 30 (step S101). When there is no update program to be transferred (NO in step S101), the CPU 11 does not perform the subsequent operation, and stands by until a next predefined timing comes.

When there is an update program to be transferred (YES in step S101), the CPU 11 acquires the size Δ of the update program from the notification of update from the management server 5 (step S103). The CPU 11 monitors the occupancy Oc of the in-vehicle communication line 16 (transfer bus) to which the target ECU 30 is connected. Then, based on the occupancy Oc, the CPU 11 calculates a free bandwidth B of the in-vehicle communication line 16 (step S105).

The CPU 11 calculates an index value Δ/B from the free bandwidth B and the size Δ of the update program, and compares the index value Δ/B with the threshold value α stored in advance (step S107). When the index value Δ/B is smaller than the threshold value α (NO in step S107), the CPU 11 determines to start transfer of the update program (step S109). In this case, the CPU 11 executes the operation in and after step S3 in FIG. 5.

When the index value Δ/B is equal to or greater than the threshold value α (YES in step S107), the CPU 11 determines not to transfer the update program, and outputs a control signal that causes an output device (not shown) connected to the gateway 10 to perform notification. Thus, notification is performed by the output device (step S111). The output device is, for example, a display, a loudspeaker, or the like. In this case, the operation in and after step S3 in FIG. 5 is not performed.

Examples of the notification in step S111 include: notification indicating that the update program is not transferred to the ECU 30; notification that urges stopping the vehicle 1 and switching to the repro mode; and notification that urges update of the control program by a dealer. This notification allows the user to know that the update program is not transferred. Therefore, the user can take a countermeasure for update of the control program, such as causing the vehicle 1 to stop and enter the repro mode, or garaging the vehicle 1 and asking the dealer for update of the control program.

Since a large number of pieces of information are exchanged among the plurality of ECUs 30 while the vehicle 1 is traveling, the occupancy Oc of each in-vehicle communication line 16 tends to be high. Therefore, if the vehicle 1 is stopped, the occupancy Oc may be lowered. The lowered occupancy Oc may cause the index value Δ/B to be smaller than the threshold value α. Therefore, transfer of the update program and update of the control program may be executed earlier.

Through the aforementioned operation, the CPU 11 ends, for one update program, determination whether or not to transfer this update program to the target ECU 30. The CPU 11 repeats this operation. Therefore, when there are a plurality of update programs to be transferred, the CPU 11 performs the same operation as above on a next update program to determine whether or not to transfer this update program to the target ECU 30. That is, when a certain update program has been determined not to be transferred to the target ECU 30, the CPU 11 determines whether or not to transfer a next update program to the target ECU 30. When the determination result is positive, transfer of the next update program is executed. Thus, the plurality of update programs can be efficiently transferred to the corresponding ECUs 30, thereby efficiently performing update of the control programs.

Effect of First Embodiment

In the program updating system according to the first embodiment, when the size Δ of an update program is small relative to the free bandwidth B of an in-vehicle communication line 16 to be used for transfer of the update program to an ECU 30, transfer of the update program is started. When the size Δ of the update program is great relative to the free bandwidth B, transfer of the update program is not performed. Therefore, a large-size update program is not transferred when the occupancy Oc of the in-vehicle communication line 16 is high. That is, an excessive load is not applied to communication using the in-vehicle communication line 16. Thus, the transfer time is prevented from becoming longer than usual due to an excessive load on the communication. Further, information for control during communication is prevented from being lost due to communication failure.

When transfer of a previous update program has not been started, transfer of another update program, whose size Δ is small relative to the free bandwidth B of the in-vehicle communication line 16, is performed preferentially compared to transfer of the previous update program. That is, in the program updating system according to the first embodiment, a plurality of update programs can be efficiently transferred without an excessive load being applied on the in-vehicle network, thereby efficiently executing update of the control programs.

<Modification 1>

A band margin (allowance band) M is set for the band of each in-vehicle communication line 16, and a band obtained by eliminating the band margin M from the whole band Bw of the in-vehicle communication line 16 may be allowed to be used as a maximum occupancy Om (Om=(Bw−M)/Bw). The band margin M is, for example, 70% of the whole band Bw. In this case, the free bandwidth B may be a value (B=Bw·(Om−Oc)) obtained by subtracting the occupancy Oc from the maximum occupancy Om that is allowed for the in-vehicle communication line 16. Thus, the band margin M is secured even when the in-vehicle communication line 16 is occupied for transfer of an update program in addition to the current occupancy.

In this case, the transfer control unit 112 stores therein the band margin M in advance, and calculates the maximum occupancy Om of the in-vehicle communication line 16. Alternatively, the transfer control unit 112 stores therein the maximum occupancy Om of the in-vehicle communication line 16 in advance.

The band margin M and the maximum occupancy Om are not necessarily fixed values, and may be set for each update program by the management server 5.

The band margin M may vary among different in-vehicle communication lines 16.

In other words, the plurality of in-vehicle communication lines 16A and 16B may include in-vehicle communication lines 16 having different band margins M. In this case, the transfer control unit 112 stores therein the band margin M or the maximum occupancy Om for each in-vehicle communication line 16 in advance, and determines whether or not to transfer an update program by using the band margin M or the maximum occupancy Om regarding an in-vehicle communication line 16 to be used for transfer of the update program.

In this modification, in step S105 of FIG. 6, the CPU 11 calculates the free bandwidth B by using the maximum occupancy Om regarding the in-vehicle communication line 16 to be used for transfer of the update program. That is, the plurality of in-vehicle communication lines 16A and 16B may include in-vehicle communication lines 16 whose free bandwidths B are calculated by different methods.

As described above, the free bandwidth B of each in-vehicle communication line 16 is calculated by a calculation method according to the in-vehicle communication line 16. Therefore, even when different band margins M are set on the respective in-vehicle communication lines 16, it is possible to efficiently update the control program, flexibly for each communication line, while reducing a communication load using the in-vehicle communication line 16.

<Modification 2>

In the transfer control process shown in FIG. 6, when the index value Δ/B of the update program is equal to or greater than the threshold value α in step S107 (YES in step S107), the CPU 11 further determines whether or not the update program satisfies a pre-defined suspending condition (step S113). Examples of the suspending condition include: the current time being within a predetermined period from when the update program was determined as a download target for the vehicle 1 in the DL server 6; the number of times of determination whether or not to transfer the update program to the ECU 30 has been performed being within a predetermined number of times; another update program to be downloaded being present in the DL server 6; and a combination thereof.

When the update program satisfies the suspending condition (YES in step S113), the CPU 11 suspends, at this point in time, determining not to transfer the update program, and does not start the transfer. In this case, transfer of the update program to the ECU 30 is not started at that point in time, and the update program is retained in the DL server 6 or the gateway 10. Therefore, whether or not to transfer this update program to the ECU 30 will be determined again in a transfer control process to be executed at a later timing. That is, even though the update program has once been determined not to be transferred, as long as the update program satisfies the suspending condition, determination regarding transfer of this update program to the ECU 30 is postponed to be later than determination regarding another update program.

While the vehicle 1 is traveling, the index value Δ/B often becomes equal to or greater than the threshold value α because the occupancy Oc of the in-vehicle communication line 16 is high. However, the occupancy Oc of the in-vehicle communication line 16 can be lowered if the vehicle 1 stops, for example. If such a timing has arrived during the period when the suspending condition is satisfied, the index value Δ/B can be smaller than the threshold value α, which may allow transfer of the update program to the ECU 30. Therefore, according to the determination in the transfer control process of the second modification, when the occupancy Oc of the in-vehicle communication line 16 is high, such as when the vehicle 1 is traveling, transfer of an update program whose size Δ is small is preferentially performed, and transfer of an update program whose size Δ is great is postponed until the occupancy Oc of the in-vehicle communication line 16 is lowered by, for example, the vehicle 1 being stopped. Therefore, the control program can be efficiently updated while reducing the load on the communication using the in-vehicle communication line 16.

Second Embodiment

In the program updating system according to the first embodiment, transfer of an update program is started in accordance with an occupancy Oc of an in-vehicle communication line 16 to be used for transfer of the update program. However, the occupancy Oc varies depending on the traveling state or the like of the vehicle 1. Therefore, even when the occupancy Oc was sufficiently low to allow transfer of the update program at start of the transfer, the occupancy Oc may be increased during the transfer depending on the traveling state or the like. Consequently, the size Δ of the update program may become great relative to the free bandwidth B while the update program is being transferred. In this case, if the transfer of the update program is continued, drawbacks, such as the transfer time becoming longer than usual and information for control during communication being lost due to communication failure, may occur. Therefore, in the program updating system according to the second embodiment, continuation of transfer of an update program is controlled during the transfer to control the timing to transfer the update program.

The transfer control unit 112 of the gateway 10 according to the second embodiment updates a transfer speed (transfer rate) of an update program in an in-vehicle communication line 16 on the basis of an occupancy Oc of the in-vehicle communication line 16. Further, the transfer control unit 112 determines whether or not to continue the transfer, on the basis of a time T required for transferring the update program at the transfer rate.

The transfer control unit 112 determines a transfer rate V on the basis of the occupancy Oc that is being monitored by the monitoring unit 111. As one example, the transfer control unit 112 determines the transfer rate V such that the occupancy Oc being monitored by the monitoring unit 111 approaches a target occupancy. For this purpose, the transfer control unit 112 may store therein a relational expression between the occupancy Oc and the transfer rate V in advance, and may calculate the transfer rate V by substituting the occupancy Oc obtained by the monitoring unit 111 into the relational expression. The transfer control unit 112 may store therein a correspondence relation between the occupancy Oc and the transfer rate V in advance, and may read out, from the correspondence relation, the transfer rate V corresponding to the occupancy Oc obtained by the monitoring unit 111.

During transfer of the update program, the transfer control unit 112 continues to monitor the occupancy Oc, determines a transfer rate V on the basis of the occupancy Oc at a predetermined interval (update interval), and updates the transfer rate V of the update program.

Upon determining the transfer rate V, the transfer control unit 112 calculates a time (total transfer time) T required for transfer of the update program, on the basis of the size and transfer rate V of the update program. Based on the total transfer time T, the transfer control unit 112 determines whether or not to continue the transfer of the update program.

The transfer control unit 112 stores therein in advance a total transfer time that allows continuation of transfer of the update program, as a threshold value Th (second threshold value), and compares the calculated total transfer time T with the threshold value Th. When the total transfer time T is less than the threshold value Th (T<Th), the transfer control unit 112 determines to continue the transfer of the update program. When the total transfer time T is equal to or longer than the threshold value Th (T≥Th), the transfer control unit 112 suspends the transfer of the update program.

[Transfer Control Process]

Figure 7:
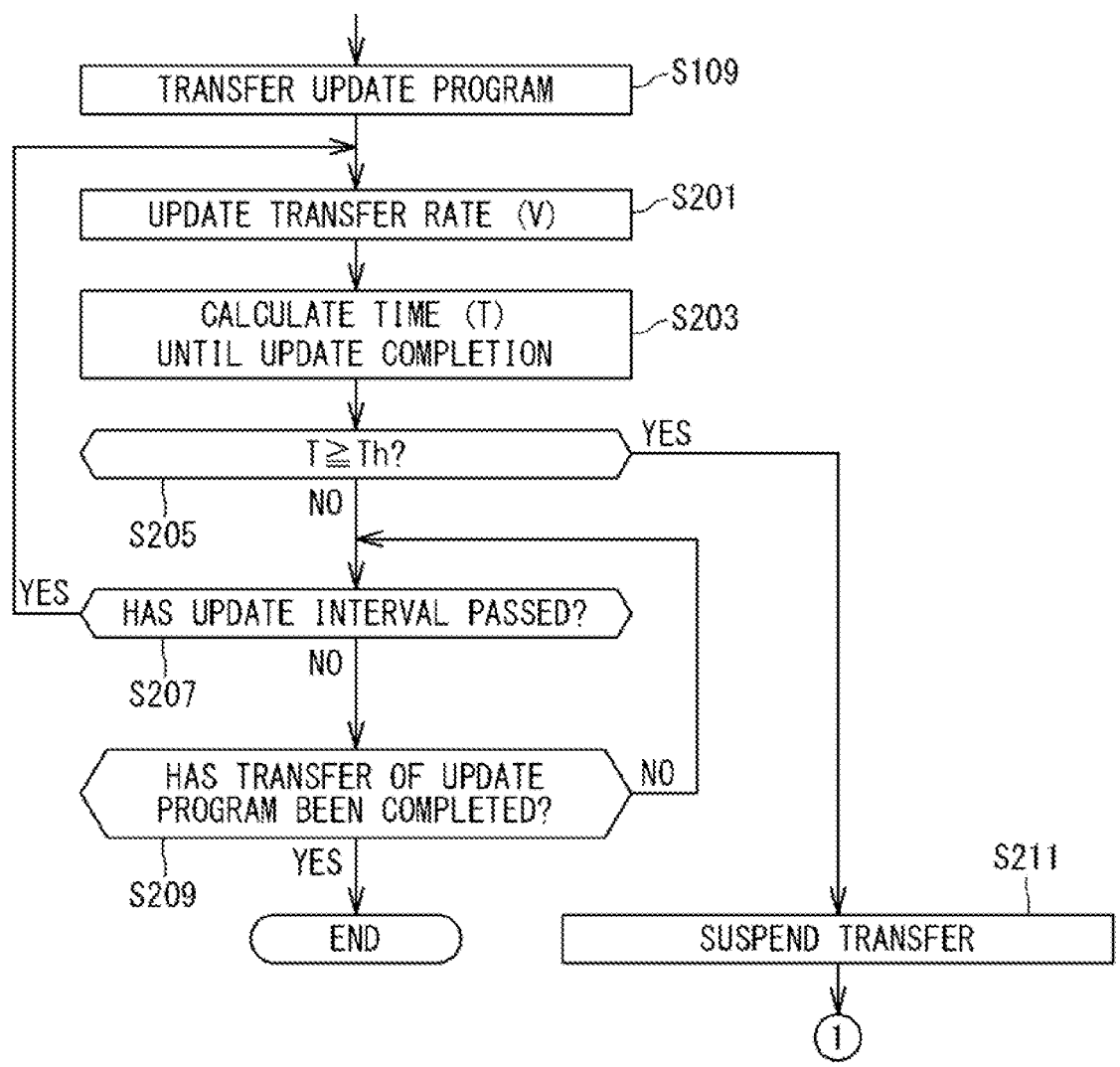
FIG. 7 is a flowchart showing a specific content of a transfer control process in the program updating system according to a second embodiment.

FIG. 7 is a flowchart showing the specific content of the transfer control process in the program updating system according to the second embodiment. The process shown in the flowchart of FIG. 7 is also executed when the CPU 11 of the gateway 10 implements the functions of the monitoring unit 111 and the transfer control unit 112 by reading out one or a plurality of programs stored in the storage unit 13 onto the RAM 12 and executing the read program. The process shown in FIG. 7 is performed during transfer of the update program after the CPU 11 has started transfer of the update program at step S109 in FIG. 6.

With reference to FIG. 7, the CPU 11 continues to monitor the occupancy Oc of the in-vehicle communication line 16 even after transfer of the update program has started. After transfer of the update program has started (step S109), when a predetermined update interval has been reached, the CPU 11 determines the transfer rate V on the basis of the occupancy Oc of the in-vehicle communication line 16, and updates the transfer rate of the update program (step S201).

Based on the size Δ and transfer rate V of the update program, the CPU 11 calculates a time (total transfer time) T required until the transfer of the update program is completed (step S203). Then, the CPU 11 compares the calculated total transfer time T with the threshold value Th that is stored in advance (step S205). The threshold value Th is not necessarily a fixed value, and may be set for each update program by the management server 5.

When the total transfer time T is less than the threshold value Th (NO in step S205), the CPU 11 continues the transfer at the updated transfer rate V until reaching the next update interval (NO in step S207, and NO in step S209). If the transfer of the update program is completed before reaching the next update interval (YES in step S209), the CPU 11 ends the series of operations.

When the next update interval is reached during the transfer at the updated transfer rate V (YES in step S207), the CPU 11 repeats the operation from step S201. That is, the CPU 11 updates the transfer rate V on the basis of the occupancy Oc at a time point corresponding to each update interval. Then, the CPU 11 determines whether or not to continue the transfer, on the basis of the total transfer time T at the transfer rate V. Thus, even when the occupancy Oc of the in-vehicle communication line 16 is changed during transfer of the update program, the transfer rate V can be adjusted to an appropriate transfer rate according to the occupancy Oc, and control of the transfer timing (whether or not to suspend the transfer) can be flexibly performed in accordance with a change in the occupancy Oc.

When the total transfer time T is equal to or longer than the threshold value Th (YES in step S205), the CPU 11 suspends the transfer of the update program (step S211). Thus, it is possible to suspend the transfer of the update program whose size relative to the free bandwidth becomes great, in other words, whose total transfer time T becomes equal to or longer than the threshold value Th, due to a change in the occupancy Oc. Therefore, transfer control can be flexibly performed in accordance with a change in the occupancy Oc after start of the transfer.

The CPU 11, which has suspended the transfer of the update program, performs the operation in and after step S111 in FIG. 6. That is, the CPU 11 may perform notification in step S111 in FIG. 6. Examples of this notification include: notification indicating that transfer of the update program to the ECU 30 is suspended; and notification that urges stopping the vehicle 1 and switching to the repro mode. Thus, the user can know that the transfer of the update program is suspended. Therefore, the user can take a countermeasure for resumption of transfer of the update program, such as causing the vehicle 1 to stop and enter the repro mode, or garaging the vehicle 1 and asking a dealer for update of the control program.

Next, after the notification in step S111, the CPU 11 executes the operation in and after step S101. That is, after the CPU 11 has suspended the transfer of the update program in step S211, the CPU 11 determines whether or not to transfer another update program. Thus, a plurality of update programs can be efficiently transferred, thereby efficiently executing update of the control programs.

As in the second modification, the CPU 11 may further determine whether or not the update program satisfies the suspending condition as described above (step S113). Then, the CPU 11 may execute the operation from step S101 again within a period during which the update program satisfies the suspending condition (YES in step S113). After the CPU 11 has temporarily suspended the transfer of the update program, transfer of the update program may become allowable if the occupancy Oc of the in-vehicle communication line 16 is changed depending on the traveling state of the vehicle 1. If such a state change occurs during the period in which the suspending condition is satisfied, transfer of the update program being suspended is resumed. Thus, convenience of the user can be improved.

Effect of Second Embodiment

In the program updating system according to the second embodiment, transfer of an update program is suspended when the occupancy Oc of the in-vehicle communication line 16 is changed (increased) during the transfer and thereby the size of the update program becomes great relative to the free bandwidth. Thus, even after start of transfer of the update program, it is possible to avoid drawbacks such as the transfer time becoming longer than usual and information for control during communication being lost due to communication failure. That is, in the program updating system according to the second embodiment, transfer of the update program can be efficiently continued without applying an excessive load on the in-vehicle network.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
10 gateway (control apparatus)
11 CPU
12 RAM
13 storage unit
14 in-vehicle communication unit
15 wireless communication unit
16, 16A, 16B in-vehicle communication line
30 ECU
31 CPU
32 RAM
33 storage unit 34 communication unit
35 start-up unit
51 CPU
52 ROM
53 RAM
54 storage unit
55 communication unit
111 monitoring unit
112 transfer control unit

The invention claimed is:

1. A control apparatus which is connected to an on-vehicle control device via an in-vehicle communication line, and constitutes, together with the on-vehicle control device, an in-vehicle network with the in-vehicle communication line being a transmission path, the control apparatus comprising:
   a storage unit configured to store therein an update program for the on-vehicle control device;
   a monitoring unit configured to monitor an occupancy of the in-vehicle communication line; and
   a transfer control unit configured to control a timing to transfer the stored update program to the on-vehicle control device, on the basis of the occupancy being monitored, wherein
   the transfer control unit calculates a time required until the transfer is completed, by using the size of the update program and a transfer speed of the update program which is determined based on the occupancy, and determines, based on the required time, whether or not to continue the transfer of the update program, and wherein
   the transfer control unit
      updates the transfer speed of the update program at a predetermined update interval, on the basis of the occupancy, during the transfer of the update program,
      calculates the required time from the updated transfer speed, and
      determines, based on the required time, whether or not to continue the transfer of the update program.

2. The control apparatus according to claim 1, wherein the transfer control unit suspends the transfer when the required time is equal to or longer than a second threshold value.

3. The control apparatus according to claim 1, wherein
   when the transfer control unit has suspended the transfer, the transfer control unit controls a timing to transfer another update program to be transferred, to the on-vehicle control device.

4. The control apparatus according to claim 2, wherein the control apparatus is connected to an output device, and when transfer of the update program is suspended, the transfer control unit outputs a control signal that causes the output device to perform a notification indicating that transfer of the update program is suspended.

5. A method for transferring an update program for an on-vehicle control device from a control apparatus to the on-vehicle control device, the control apparatus being connected to the on-vehicle control device via an in-vehicle communication line, the control apparatus constituting, together with the on-vehicle control device, an in-vehicle network with the in-vehicle communication line being a transmission path, the method comprising the steps of:
   monitoring an occupancy of the in-vehicle communication line; and
   controlling a timing to transfer the update program to the on-vehicle control device, on the basis of the occupancy being monitored, wherein
   the controlling includes:
   calculating a time required until the transfer is completed, by using the size of the update program and a transfer speed of the update program which is determined based on the occupancy, and determining, based on the required time, whether or not to continue the transfer of the update program;
   updating the transfer speed of the update program at a predetermined update interval, on the basis of the occupancy, during the transfer of the update program;
   calculating the required time from the updated transfer speed; and
   determining, based on the required time, whether or not to continue the transfer of the update program.

6. A non-transitory computer readable storage medium storing a computer program for causing a computer to function as a control apparatus which is connected to an on-vehicle control device via an in-vehicle communication line, and constitutes, together with the on-vehicle control device, an in-vehicle network with the in-vehicle communication line being a transmission path,
   the computer having a storage unit in which an update program for the on-vehicle control device is stored,
   the computer program causing the computer to function as:
   a monitoring unit configured to monitor an occupancy of the in-vehicle communication line; and
   a transfer control unit configured to control a timing to transfer the stored update program to the on-vehicle control device, on the basis of the occupancy being monitored, wherein
   the transfer control unit calculates a time required until the transfer is completed, by using the size of the update program and a transfer speed of the update program which is determined based on the occupancy, and determines, based on the required time, whether or not to continue the transfer of the update program, and wherein
   the transfer control unit
      updates the transfer speed of the update program at a predetermined update interval, on the basis of the occupancy, during the transfer of the update program,
      calculates the required time from the updated transfer speed, and
      determines, based on the required time, whether or not to continue the transfer of the update program.

* * * * *